UNITED STATES PATENT OFFICE.

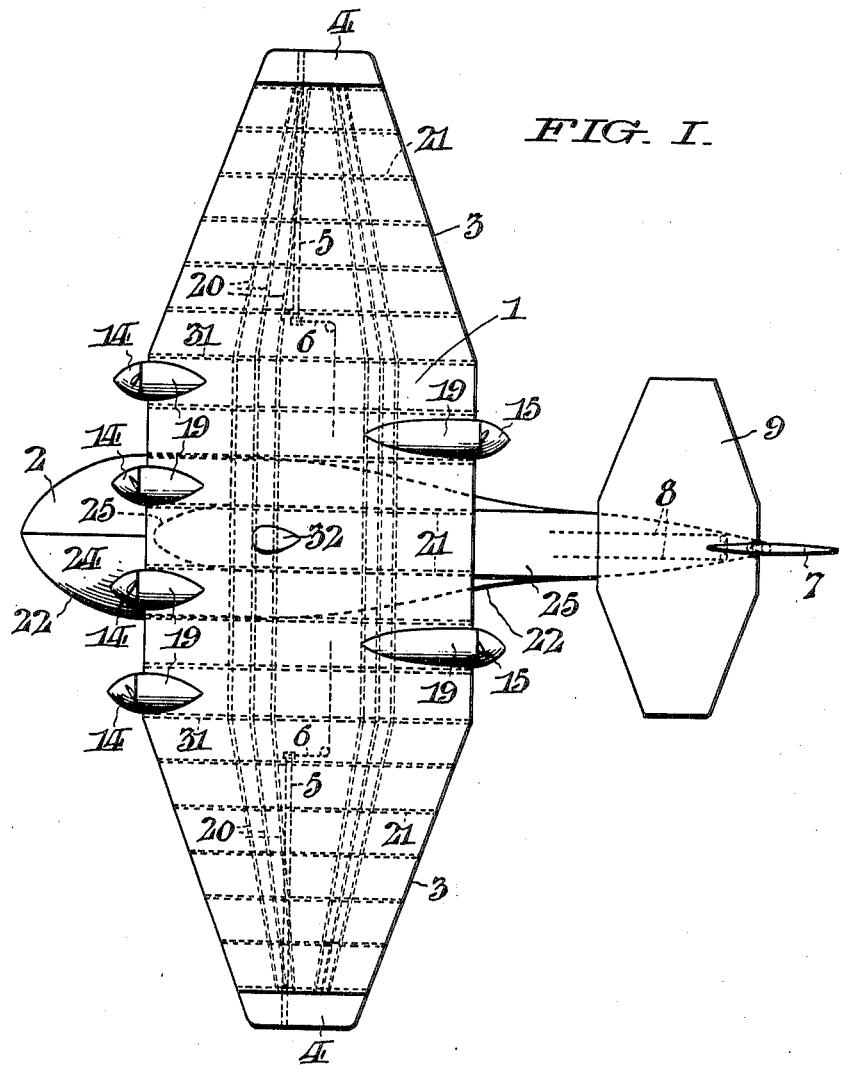

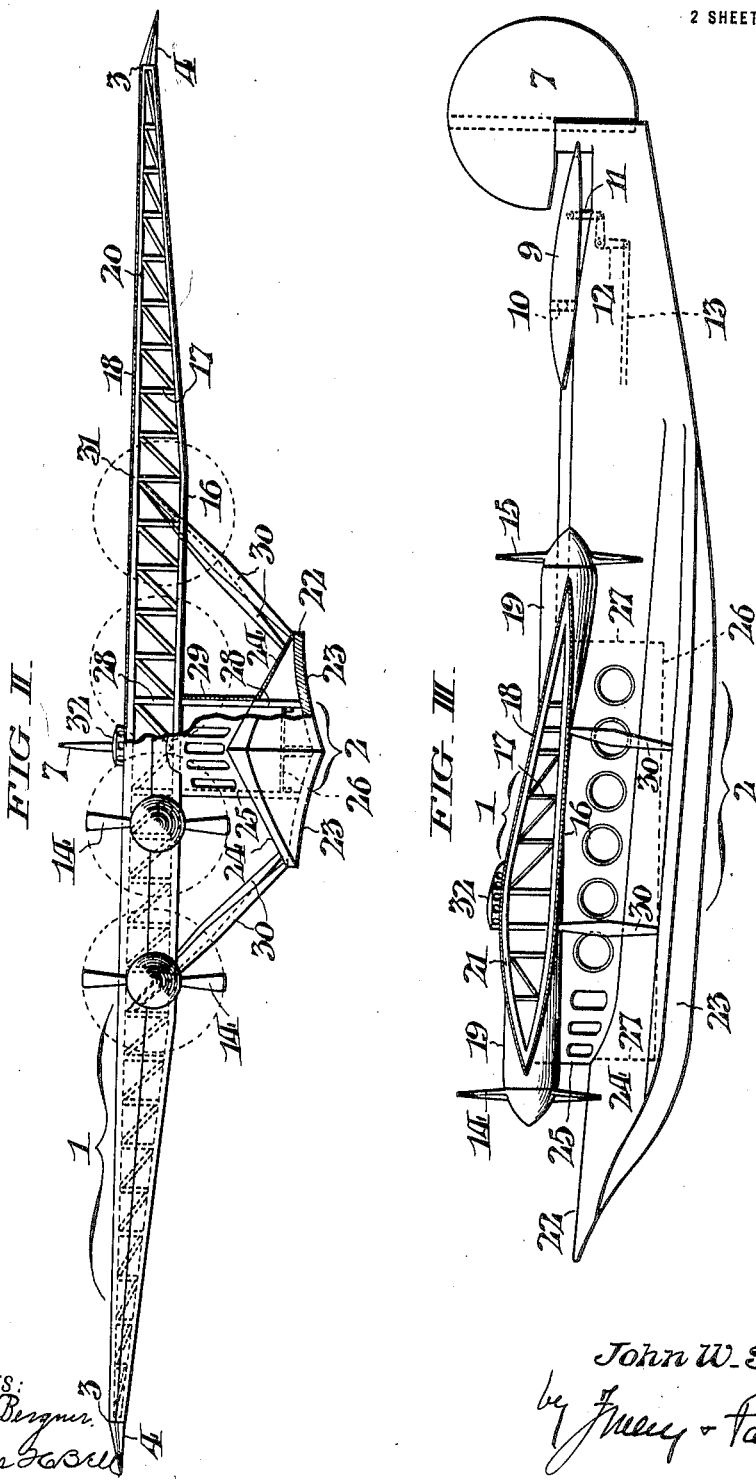

JOHN W. SMITH, OF PHILADELPHIA, PENNSYLVANIA.

FLYING-MACHINE.

1,396,974.    Specification of Letters Patent.    Patented Nov. 15, 1921.

Application filed February 12, 1919. Serial No. 276,521.

*To all whom it may concern:*

Be it known that I, JOHN W. SMITH, a citizen of the United States, and a resident of Philadelphia, in the county of Philadelphia and State of Pennsylvania, have invented certain new and useful Improvements in Flying-Machines, of which the following is a specification, reference being had to the accompanying drawings.

My invention relates to flying machines, and especially to airplanes of the sea-plane type; and a principal object of the invention is to make possible the attainment and maintenance of very high speeds. Other objects and advantages attainable in connection with the invention will appear from the description hereinafter of the best embodiment at present known to me, while its scope and essential features will be indicated in my claims.

The major factors controlling the speed of an airplane machine per unit of effective propulsive power are shape and arrangement of "planes" or airfoils; weight relative to air foil carrying capacity; and air resistance of non-supporting parts relative to airfoil carrying capacity,—usually termed "parasite resistance." Speeds of two hundred miles per hour or more may be had with power plant and weights common in present practice, and airfoil shapes have been developed which are very efficient at speeds far in excess of those now found practicable for airplanes,—indeed, such high-speed airfoils are more efficient than low speed ones. The factor which at present limits the speed attainable is, therefore, the parasite resistance.

It is my aim to eliminate and minimize parasite resistance without increase of weight, by so constructing and combining the airfoil and the vessel or service body and other elements of the flying machine as to eliminate hundreds of exposed struts, wires, braces, etc., whose parasite resistance in proportion to their bulk is very high. I have also found it possible to virtually eliminate the engine and other power plant as a source of parasite resistance. In addition,—largely owing to features of arrangement and construction which in themselves materially reduce parasite resistance,—I have found it possible to secure an exceptionally large and commodious inclosed space suitable for the accommodation of passengers and freight.

In the drawings, Figure I, is a plan view of a seaplane or hydro-plane type of flying machine embodying my invention.

Fig. II, is a head-on view of the machine, on a larger scale, the right-hand portion being in section to expose the internal structure.

Fig. III, is a side elevation, the airfoil being in section at a plane between the observer and the vessel.

From the drawings generally, it will be seen that the machine comprises a large transversely extended supporting airfoil 1, and a fore and aft service body or vessel 2, supported by this airfoil. The airfoil wings 3, 3, have movable tips or ailerons 4, 4, for controlling lateral "trim" and stability, each with suitable operating or warping gear indicated by a pivot shaft 5, and a wheel and cable arrangement 6. Provision for horizontal steering is made in the form of a vertical balanced rudder 7, at the tail of the body 2, and suitable cable gear 8, and for vertical steering and control of longitudinal or fore and aft trim and stability by means of a trailing elevator airfoil or horizontal rudder 9, in tandem relation with the main airfoil 1. This elevator 9, is pivoted on top of the body 2, at 10, just ahead of the rudder 7, and is equipped (see Fig. III) with operating gear indicated by a link 11, a bell-crank lever 12, and a rod 13. For propulsion, there are provided four propellers 14, at the front of the machine and two propellers 15, at its rear, each preferably driven by its own complete individual engine equipment, etc. The arrangement of these six complete power plants and of the accessory exposed structure is an important matter in reference to parasite resistance, and will be described in detail hereinafter.

Referring, now, more particularly to the supporting airfoil 1, it will be seen that it comprises a lower exposed supporting surface 16, a framework comprehensively denoted as 17, for spreading the surface 16, and transmitting and distributing thereto the weight of the body 2, and of other parts, and an upper exposed surface 18, overlying the framework 17. The surfaces 16 and 17, coalesce at all their edges, so as to form a thin, closed airfoil body which completely incloses the framework 17, by which its form is maintained, and they are everywhere "fair" and of substantially stream-line form, so that the airfoil body offers a minimum of resistance to travel through the air. The supporting surface 16, is preferably made nearly flat with only a slight up curve at its leading and trailing edges, most of the curvature necessary to the accommodation of the frame-work 17, being in the cover surface 18.

In the ordinary type of flying machine at present in use, the engines and the rest of the power plant are either mounted in the service body, where they reduce the useful space excessively, or are provided with separate cowlings and inclosures of their own,—an arrangement entailing considerable additional parasitic resistance. I obviate all such disadvantages by mounting the power plants in the airfoil body 1, inclosing such portions of them as can not be accommodated within its general outline in mountings or cowlings 19, whose exposed surfaces are themselves of fair, stream-line, cylindrical or conical form with conoidal ends embodying the hubs of the propellers 14, and 15. While these mountings extend beyond the airfoil surfaces proper, they also merge into these surfaces, so as to avoid augmentation of the air resistance to any considerable extent. This arrangement allows free intercommunication among the power plants inside the airfoil 1, so that in large machines repairs can be made while in flight. As the fore and aft projected areas of the mountings 19, practically coincide with that of the airfoil 1, itself, they offer practically no additional resistance except that of skin friction,—the ordinary "head" resistance of the engine being thus virtually eliminated.

In order to reduce the thickness of the airfoil 1, to the minimum compatible with other requirements, and to avoid encumbrance of its interior, the frame structure 17, is best made of truss construction, with some half a dozen transverse members 20, extending from tip to tip of the wings 3, 3, and a larger number of fore and aft members 21, secured to said transverse members at suitable intervals to spread and maintain the surface 16, properly. (See especially Fig. I.) I have shown the truss structure 17, in a somewhat conventional way, for the sake of clearness of illustration,—since its specific form and details will depend largely on the properties of the material of which the surfaces 16 and 18, are made and on the results to be attained in particular cases, and since the proper design of such structures is well understood in the art. Any usual or suitable materials may be used for surfaces and framework; as a matter of construction, the main consideration to be kept in view at every point is minimization of weight with due regard to strength.

Referring, now, to the service body 2, it will be seen that for some three quarters of its length abaft its head it comprises a lower vessel proper or hull 22, with flaring inclined concave hydroplaning bottom surfaces 23, 23, and inclined deck surfaces 24, 24, (see Fig. II), and an upper curve-fronted vertical sided cabin structure 25, (see also Figs. I and III) well supplied with observation windows. About three fourths of the total length aft, hull 22, and cabin structure 25, merge in the narrow, thin tapering tail that carries the rudders 7 and 9,—the airfoil 1, serving to roof most of the cabin structure 25, ahead of the point of merging. The hull 22, is easily made of sufficient buoyancy to float the whole machine properly on water, with ample freeboard,—even independently of hydroplane action,—and as the body 2, contains no propulsive power plant and machinery, its cabin 25, will easily afford liberal space for passengers and freight without being made large in comparison with current practice when it contains all the machinery. The dotted floor 26, in Figs. II and III and the dotted lines 27, 27, in Fig. 3, indicate the large, free, unobstructed space available.

While the internally trussed airfoil 1, can readily be made sufficiently strong for all practical purposes, I prefer to give it additional reinforcement by uniting the service body 2, with it in such a way as to make said body virtually part of its frame structure 17. This can be done by extending some of the upright truss pieces 28, (see Fig. II) of two of the central fore and aft members 20, clear down to the hull bottom 22, and securing to them the side plating or covering 29, of the cabin structure 25. In this way, there is formed a pair of fore and aft girders of great depth and strength. In addition to the attachment of the body 2, to the airfoil 1, which results from this mode of construction, there are inclined members 30, (see Figs. II and III), two on each side, connected between the edges of the vessel bottoms 22, and the upper chord pieces 31, 31, (see Figs. I and II,) of two of the fore and aft trusses 20. These members 30, are so constructed and connected as to be capable of acting in either tension or compression, so as to brace the whole body 2, with reference to the airfoil 1, and combine them (in effect) in a couple of strong transverse trusses or girders. At the same time, they help to transmit and distribute the body load to the airfoil.

It will be seen, furthermore, that the central portions of the transverse airfoil trusses 19,—the portions between the attachments at 31, 31, of the members 30, that is—are in effect spans supported at their ends and loaded centrally with that portion of the total weight of the machine (in excess of the supporting capacity of the central span portion of the airfoil 1) which is not transmitted to the members 31, 31, by the braces 30. The wing portions of trusses 19, on the other hand, are in effect cantalivers supported at their ends 31, 31, and loaded upward with a load equal to half the excess of the total weight of the machine over the supporting capacity of the central span portion of the airfoil 1,—distributed in proportion to the varying width of the wings 3, 3. Varying conditions of operation may, of course, alter the distribution of load somewhat; but that just described is the normal load condition.

It will be understood that from the immediately subjacent body 2, access may be had to the interior of the airfoil 1, and to the power plants through the ceiling 16, of the cabin 25. As shown, there is an auxiliary pilot house 32, at the upper side of the airfoil 1, to facilitate observations above it.

The auxiliary elevator airfoil 9, may be of internally trussed construction similar to that of the main supporting airfoil 1.

Having thus described my invention, I claim:

1. In a flying machine, the combination of an internally trussed supporting airfoil with its truss structure entirely inclosed by upper and lower airfoil surfaces; and a fore and aft vessel of inclosed type immediately subjacent to and roofed by said airfoil, and having its sides united with the airfoil frame structure to serve as fore and aft girders therefore.

2. In a flying machine, the combination of an internally trussed supporting airfoil, with its truss structure entirely inclosed by upper and lower airfoil surfaces; a fore and aft vessel immediately subjacent to said airfoil, roofed thereby and united thereto as part of its fore and aft frame structure; and inclined transverse braces connected between the lower part of said vessel and the airfoil frame structure, and coöperating with said vessel and said frame structure to truss the airfoil transversely.

3. In a flying machine, the combination of an internally trussed supporting airfoil, with power plants therein; and a fore and aft buoyant vessel entirely and immediately subjacent to and roofed by said airfoil, adapted to float the same on water, and in direct communication with said power plants through the interior of the airfoil.

4. In a flying machine, the combination of an internally trussed supporting airfoil, power plants thereon inclosed by stream-line surfaces merging into but projecting beyond the airfoil surfaces, and a fore and aft vessel forming a part of the frame structure for maintaining the shape of said airfoil.

5. A structure in accordance with claim 4, wherein the vessel is of inclosed type and its roof is formed by the airfoil.

6. In a flying machine, the combination of a supporting internally trussed airfoil with a central span-truss construction and cantaliver truss wing construction, and a fore and aft vessel entirely subjacent to said airfoil and forming a part of the frame structure for maintaining the shape thereof.

7. In a flying machine, the combination of means forming upper and lower exposed surfaces of stream-line form coalescing at their edges to form a thin closed stream-line airfoil body with a frame structure for maintaining its form completely inclosed within it, a plurality of power plant mountings with inclosing surfaces of stream-line form outside of the airfoil proper, and a service body of stream line form affording liberal passenger and cargo space immediately subjacent to the airfoil and in communication, through its interior, with the power plants.

In testimony whereof I have hereunto signed my name at Philadelphia, Pennsylvania, this fourth day of February, 1919.

JOHN W. SMITH.

Witnesses:
JAMES H. BELL,
E. L. FULLERTON.